UNITED STATES PATENT OFFICE.

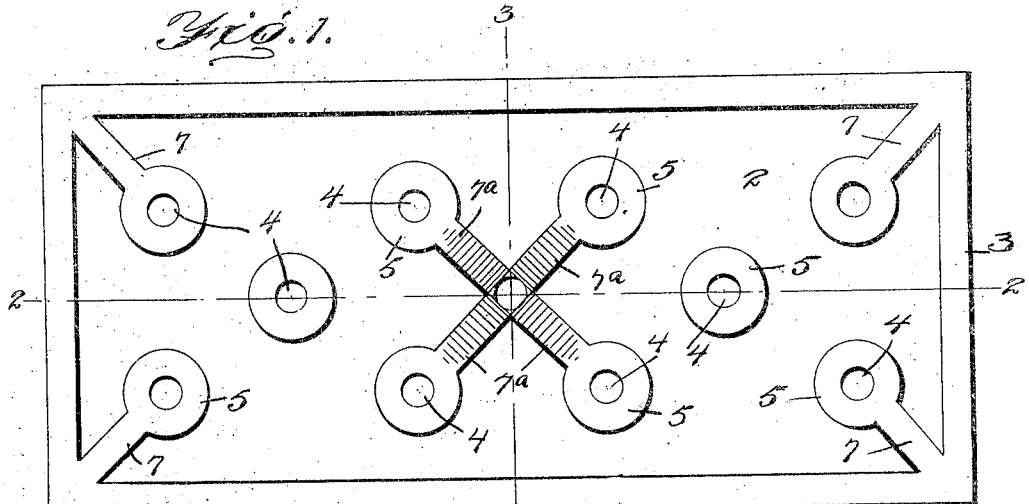
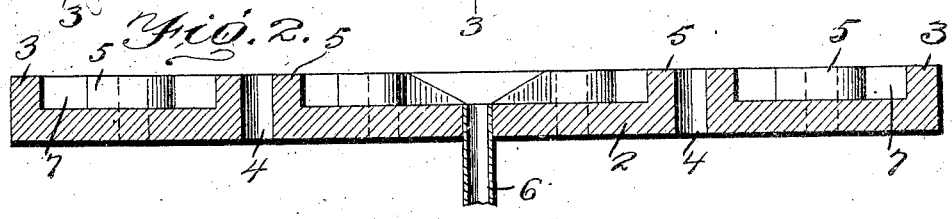
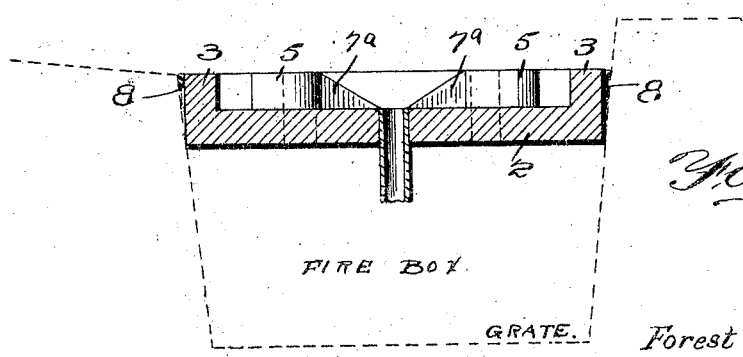

FOREST WILLIAMS, OF HOBART, OKLAHOMA.

OIL-BURNER.

1,026,015. Specification of Letters Patent. Patented May 14, 1912.

Application filed August 24, 1911. Serial No. 645,779.

*To all whom it may concern:*

Be it known that I, FOREST WILLIAMS, a citizen of the United States, residing at Hobart, in the county of Kiowa and State of Oklahoma, have invented certain new and useful Improvements in Oil-Burners, of which the following is a specification.

My invention relates to oil burners and particularly to that type of burner in which a burning pan is used, the oil being allowed to flow into the pan and being ignited therein, the object of the invention being to provide a very simple, durable and efficient burner of this type practically made in one piece, having no parts which may be easily broken or destroyed by the heat of the burning oil, means being provided for the admission of air to the flames above the oil and providing for a uniform flow of oil over all the surface of the burner.

My invention is illustrated in the accompanying drawings wherein:

Figure 1 is a plan view of my improved burner. Fig. 2 is a longitudinal section on the line 2—2 of Fig. 1. Fig. 3 is a transverse section on the line 3—3 of Fig. 1, the dotted lines showing the position of the burner within a stove.

Corresponding and like parts are referred to in the following description and indicated in all the views of the accompanying drawings by the same reference characters.

My improved burner comprises a pan formed of a relatively flat plate 2 preferably rectangular in plan and having an upstanding rim 3. The plate 2 and the rim 3 are preferably integral.

Passing through the plate 2 which forms the bottom of the pan are a plurality of air openings 4. As shown, there are ten of these air openings in the plate disposed, two at each end, four at the middle of the plate and two between the middle set of openings and the pairs of holes at the ends of the plate. I do not, however, wish to be limited to this arrangement.

Surrounding each of the air openings 4 is an upstanding wall 5, the upper edge of this wall being flush with the upper edge of the rim 3. These walls 5 prevent the oil which may be contained in the pan from passing out through the air openings and thus maintain a uniform level of oil over the whole surface of the pan.

An oil supply pipe 6 passes through the bottom of the pan and discharges at the center of the pan. This supply pipe is of course connected to any source of oil, the oil being so regulated that a uniform depth of oil will be kept within the pan.

Extending from each of the circular walls 5 that surround the air openings at the ends of the pan or plate 2 is a deflecting wall 7, each deflecting wall extending to the adjacent corner of the burning pan. Extending centrally from each of the walls surrounding the central set of air openings are the deflecting walls 7ᵃ which are directed toward the central oil inlet opening. These walls 7ᵃ are beveled upon their upper faces toward the fuel inlet opening. These deflecting walls 7 and 7ᵃ afford means for collecting the light oil for igniting purposes when lighting the burner.

Preferably the plate 2 with the rim 3, the circular walls 5 and the angularly extending deflecting walls 7 and 7ᵃ are made in one piece, as by casting. In operation, the burning pan is set within the fire box of the stove in the manner shown in Fig. 3, cement 8 being placed between the sides of the burning pan and the adjacent wall of the fire box. The oil supply pipe 6 is of course connected in any suitable manner to a source of supply.

The operation of my device will be obvious from what has gone before. Fuel is turned on at the supply pipe and allowed to flow into the burning pan. It is then ignited and burns over the entire surface of the pan, the burning oil being confined by the walls 3 and 5. Air for proper combustion is admitted through the air holes 4 and is uniformly distributed by reason of the disposition of the draft openings.

What I claim is:

1. An oil burner comprising a plate having a marginal upstanding wall, said plate being formed with a pair of air inlet openings at each end, each surrounded by an upstanding wall, the plate being also formed with a central oil supply opening and with a plurality of air inlet openings disposed around the oil supply opening, each of said last named air inlet openings being surrounded by an upstanding wall, deflecting walls extending radially from the central oil supply opening, and deflecting walls extending from each of the walls surrounding the pairs of openings at the ends of the plate to the adjacent corners of the plate.

2. An oil burner comprising a plate having a marginal upstanding wall, said plate being formed with a pair of air inlet holes at each end, each surrounded by an upstanding wall, the plate being also formed with a central oil supply opening and with a plurality of air inlet openings disposed around the oil supply opening, each of said last named inlet openings being surrounded by an upstanding wall, centrally disposed deflecting walls extending radially from the central oil supply opening, and having faces inclined upwardly from said opening to the walls of the adjacent air inlet openings, and deflecting walls extending from each corner of the plate to the wall surrounding the adjacent air inlet opening.

In testimony whereof, I affix my signature in presence of two witnesses.

FOREST WILLIAMS. [L.S.]

Witnesses:
G. H. SALISBURY,
TILDEN GOOCH.